United States Patent [19]

Steege

[11] Patent Number: 5,753,114
[45] Date of Patent: May 19, 1998

[54] DEVICE FOR PURIFYING WATER BY MEANS OF WATER FLEAS

[76] Inventor: Johan Bernhard Steege, Hyacintenlaan 84, Geleen, Netherlands, 6163 BL

[21] Appl. No.: 860,170

[22] PCT Filed: Dec. 13, 1995

[86] PCT No.: PCT/NL95/00419

§ 371 Date: Jun. 16, 1997

§ 102(e) Date: Jun. 16, 1997

[87] PCT Pub. No.: WO96/19108

PCT Pub. Date: Jun. 27, 1996

[30] Foreign Application Priority Data

Dec. 19, 1994 [NL] Netherlands ............... 9402153

[51] Int. Cl.⁶ .................... A01K 63/04; C02F 3/32
[52] U.S. Cl. .................. 210/169; 210/94; 210/416.2
[58] Field of Search ................ 210/94, 169, 232, 210/416.2

[56] References Cited

U.S. PATENT DOCUMENTS 5,413,707  5/1995  Shatilov ................. 210/169
5,554,277  9/1996  Rief et al. ............... 210/169
5,593,574  1/1997  Van Toever ............ 210/169

FOREIGN PATENT DOCUMENTS 9002231  6/1992  Netherlands.

Primary Examiner—Neil McCarthy
Assistant Examiner—Theodore M. Green
Attorney, Agent, or Firm—Pennie & Edmonds LLP

[57] ABSTRACT

Various filters are known for purifying water in an aquarium, a fish pond, a swimming pool or a storage container at a horticultural farm. The device according to the invention contains filtering means at the top of a space in which water fleas are present, which water fleas eat the contaminations (organic waste materials) present in the water and by doing so purify the water indirectly. Said filtering means are necessary because otherwise the water fleas are carried back to the basin along with the purified water. A connecting piece comprising a water lift for transporting purified water extends through the cover of an encasing surrounding said space.

3 Claims, 1 Drawing Sheet

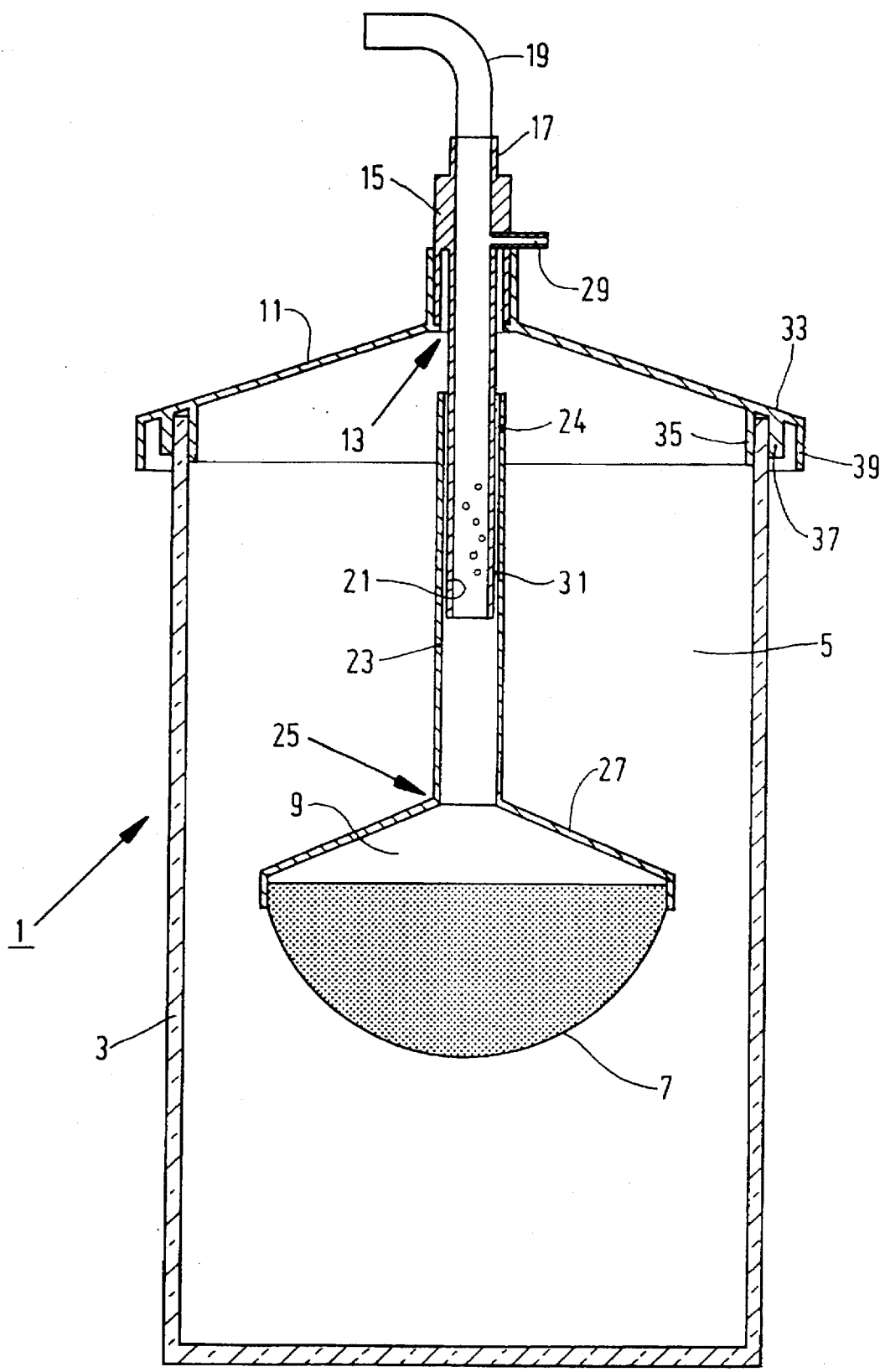

DEVICE FOR PURIFYING WATER BY MEANS OF WATER FLEAS

BACKGROUND OF THE INVENTION

The invention relates to a device for purifying water in a basin, such as for example a fishpond or an aquarium, whereby said device comprises a box-shaped transparent encasings, which bounds a space in which water fleas can be kept in numbers sufficient to purify water which enters said encasing via inlet openings, and whereby water exits the device into the bassin via an outlet, said outlet being connected to filtering means so as to prevent water fleas from being transported into said basin.

A device of this kind is known from Dutch Patent Application NL-A-9002231.

In this known device the water to be purified is supplied from the basin and is then led to a space where water fleas are present, which water fleas extract organic waste materials from the water, as a result of which the algae present in the water, which have a negative influence on the clarity of the water, are deprived of their food source, as a consequence of which they will die and precipitate. The purified water is subsequently led back to the basin.

A drawback of this known device is that any fish eggs present in the basin may find their way into said space via the water inlet openings if they become detached. Furthermore young (small) fish may find their way into said space via the water inlet openings. In that case the water fleas will be eaten by the (new) fish after the eggs have hatched, thus reducing the effectiveness of the device, which will eventually stop functioning altogether.

A further drawback of the known device is that the water fleas may leave said space, especially at night, thus reducing the effectiveness of the device.

SUMMARY OF THE INVENTION

The object of the invention is to provide a device which does not have the above drawbacks. One object is to provide a device which effectively fights algae. To that end a device according to the invention is characterized in that the device includes a cover with an edge at the upper side of the encasing, in that the filtering means are present at the top of said encasing, in that said filtering means are connected to the outlet of the device via a connecting piece, and in that said inlet are provided in a number of places between said edge of said cover and said encasing.

The invention is based on the perception that when the filtering means are placed at the top of the space rather than at the bottom, the water fleas will be unable to leave said space. The construction of the cover furthermore renders it impossible that the eggs find their way into the space via the inlet openings.

One embodiment of the device according to the invention is characterized in that said connecting piece comprises a water lift for transporting purified water.

One embodiment of a device according to the invention is characterized in that said cover comprises an additional protective edge for closing said space to fish eggs.

BRIEF DESCRIPTION OF THE DRAWINGS

The invention will be explained in more detail hereafter by way of illustration with reference to the FIGURE, in which:

An embodiment of a device for purifying water is shown.

DETAILED DESCRIPTION OF THE INVENTION

The FIGURE shows an embodiment of a device 1 for purifying water in a basin, such as for example a fishpond, an aquarium, a swimming pool or the water supply at a horticultural farm.

The device comprises a box-shaped, for example cylindrical, encasing 3 made of a transparent material, such as glass, plastic or a transparent plastic material (for example PET). The encasing 3 comprises a space 5, in which filtering means 7 are placed. Said filtering means separate a space 9 from space 5. When the device is in use water fleas are present within space 5, said water fleas being unable to reach space 5 because of the presence of the filtering means 7. The encasing 3 is closed by a cover 11 at its upper side. An opening 13 is provided in (for example) the centre of said cover. A tubular connecting piece 15 is placed in said opening. Said connecting piece includes a first end 17, on which an outlet 19 is placed. Said outlet preferably makes a bend (for example 90°) in order to achieve the desired water circulation. A tubular portion 23 of a filter holder 25 is slid over the other end 21 of connecting piece 17. At its other side 27 the filter holder includes a funnel-shaped end. The filtering means are slid into or over the end of said funnel and clamped down therein or thereon.

Connecting piece 15 furthermore includes a tubular inlet 29, which inlet may be connected to an air pump. After the filter holder 25 has been mounted on connecting piece 15, the air can move downward, via tubular inlet 29 and then via a channel 31 defined by tubular portion 24 and connecting piece 15, and subsequently upward in connecting piece 15 (via a so-called water lift) to end 21 and finally, via end 17 and outlet 19, to the basin.

While rising in connecting piece 15 the air bubbles carry along water, as a result of which water is discharged from space 9. The amount of water that has been discharged is replenished again from space 5. Small openings are provided in a number of places between edge 33 of cover 11 and the encasing 3, so as to enable said replenishing of water in space 5. As a result of this water can pass between parts 35 and 37, over the encasing, into space 5. The water flow entering space 5 via said inlet openings is so strong that the water fleas cannot escape via said openings, either. A portion 39 screens off the edge of encasing 3. Instead of connecting an air pump (to 29) it is also possible to connect a water pump to outlet 19, as a result of which the water is sucked out of the space through filter holder 25. In that case tubular inlet 29 must be closed.

In practice the water fleas appear to thrive in the water (in which algae and organic waste materials, for example from fish, are present), and they appear to purify the water to such a degree that the water exiting the device via outlet 19 has been rid of organic waste materials. Thus the basin no longer contains any food for the algae. As a result of this the algae will die and precipitate, and the water in the basin will become clear and remain so.

The device appears to function quite satisfactorily in practice, whilst in addition it is of simple design.

Once the device has been commissioned, the filtering means 7 may become silted up during the initial period. In order to clean the filtering means connecting piece 15 with filter holder 25 and filtering means 7 is lifted, turned forward and backward a few turns and then returned to its original position. Said cleaning is only necessary during the initial period after the device has been installed, because mosquito larvae will settle on filtering means 7 after some time, and once settled they will graze the filtering means clean, especially once they are fully grown.

The only maintenance which the device furthermore requires is occasional cleaning of the outside of the encasing. This is necessary because the water fleas need daylight. The amount of water fleas in space 5 is adjusted in a natural manner in dependence on the amount of waste materials and algae in the water.

The so-called water lift (29, 31, 21) can vent (the system) at the time of the installation in that the entire unit is lifted and maintained in that position until the air has been removed from the space.

I claim:

1. A device for purifying water in a basin, such as for example a fishpond or an aquarium, whereby said device comprises a box-shaped transparent encasing (3) having a top and bottom, which bounds a space (5) in which water fleas can be kept in numbers sufficient to purify water which enters said encasing (3) via inlet openings, and whereby water exits the device into the basin via an outlet (19), said outlet (19) being connected to filtering means (7) so as to prevent water fleas from being transported into said basin, characterized in that the device includes a cover (11) with an edge (33,35,37) at the upper side of the encasing (3), in that the filtering means (7) are located at a distance spaced above the bottom of said encasing (3), in that said filtering means (7) are connected to the outlet of the device via a connecting piece (15) and in that said inlet openings are provided in a number of places between said edge (33,35,37) of said cover (11) and said encasing (3), with said cover (11) being constructed to prevent passage of fish eggs into said encasing (3) via said openings.

2. A device according to claim 1, characterized in that said connecting piece (15) comprises a water lift (29,31,21) for transporting purified water.

3. A device according to claim 1 or 2, characterized in that said cover (11) comprises an additional protective edge (39) for closing said space to fish eggs.

* * * * *